March 15, 1966  R. W. HARMON  3,240,870
SUSPENSION APPARATUS FOR BUNDLE CONDUCTORS
Filed March 10, 1965  4 Sheets-Sheet 1

INVENTOR
ROBERT W. HARMON
BY *Kenneth W. Miller*
ATTORNEY

March 15, 1966 R. W. HARMON 3,240,870
SUSPENSION APPARATUS FOR BUNDLE CONDUCTORS
Filed March 10, 1965 4 Sheets-Sheet 2

INVENTOR
ROBERT W. HARMON
BY Kenneth W. Miller
ATTORNEY

March 15, 1966  R. W. HARMON  3,240,870
SUSPENSION APPARATUS FOR BUNDLE CONDUCTORS
Filed March 10, 1965  4 Sheets-Sheet 3

INVENTOR.
ROBERT W. HARMON
BY
ATTORNEY

March 15, 1966  R. W. HARMON  3,240,870
SUSPENSION APPARATUS FOR BUNDLE CONDUCTORS
Filed March 10, 1965  4 Sheets-Sheet 4

INVENTOR.
ROBERT W. HARMON
BY
ATTORNEY

United States Patent Office 3,240,870
Patented Mar. 15, 1966

3,240,870
SUSPENSION APPARATUS FOR BUNDLE CONDUCTORS
Robert W. Harmon, Doylestown, Ohio, assignor to The Ohio Brass Company, Mansfield, Ohio, a corporation of New Jersey
Filed Mar. 10, 1965, Ser. No. 446,456
11 Claims. (Cl. 174—149)

This patent is a continuation-in-part of application Serial No. 295,999, filed July 18, 1963, by the inventor herein, now abandoned.

This patent relates to power transmission lines and, more particularly, to lines constituted by a plurality of part conductors connected and arranged as a single conductor of the line.

A principal object of the invention is to provide suspension apparatus for multiple conductors which is adapted to withstand heavy line loads.

Another object of the invention is to provide a suspension apparatus for bundle conductors which is stable and adapted to maintain the disposition of the conductor cables against disturbing forces due to ice unloading and the like.

The invention relates to a modified form of the apparatus shown in United States Patent 3,076,866, issued February 5, 1963, to A. D. Lantz, in which there is disclosed various arrangements for suspending a plurality of conductor cables in laterally stable relation with respect to a string of suspension insulators in which the cables and the associated suspension apparatus are carried closely adjacent the insulators. The suspension apparatus of that patent constitutes a suspension plate pivotally connected to the lower one of the suspension insulators, with the disposition of the plate and the vertical and lateral arrangement of the conductor cables such that the gravitational and inertial forces return the assemblage to a neutral position whenever the apparatus is displaced from that position.

In the apparatus of the present invention, a plurality of insulator strings are utilized to carry the suspension plate, being spaced therefrom in the longitudinal direction of the conductor cables. According to one embodiment of the invention, a suspension plate, otherwise constructed in accordance with the principles of United States Patent 3,076,866, idem., is constructed with V-shaped anchor members. The anchor members extend in both directions from the suspension plate along the longitudinal axis of the suspension plate and of the transmission line conductor, and four strings of suspension insulators arranged in two pairs in each of the transverse and longitudinal directions of the suspension plate are connected to the anchor members for carrying the suspension plate and conductor cables from the tower or other structure.

According to another embodiment of the invention, the line conductor and suspension plate are so constituted that a conductor cable is carried between the insulator strings in the lower portion of the space between the V defined by the strings, and the anchor members are formed as separate laterally spaced parts such that the lower end insulators of the longitudinal pairs are disposed in the best angular and transversely spaced relation between the top conductor and the adjacent conductor cables transversely below and outward from the insulator strings.

Suspension apparatus constructed in accordance with the invention provides great strength and lateral and rotational stability with respect to the supporting structure while providing the favorable relations between the conductor cables and insulators described in United States Patents 3,076,863 and 3,076,864, issued February 5, 1963, to A. D. Lantz and R. W. Harmon.

The invention, together with further objects, features, and advantages thereof, will be more clearly understood from the following detailed specification and claims, taken in connection with the appended drawings in which:

Figure 1:
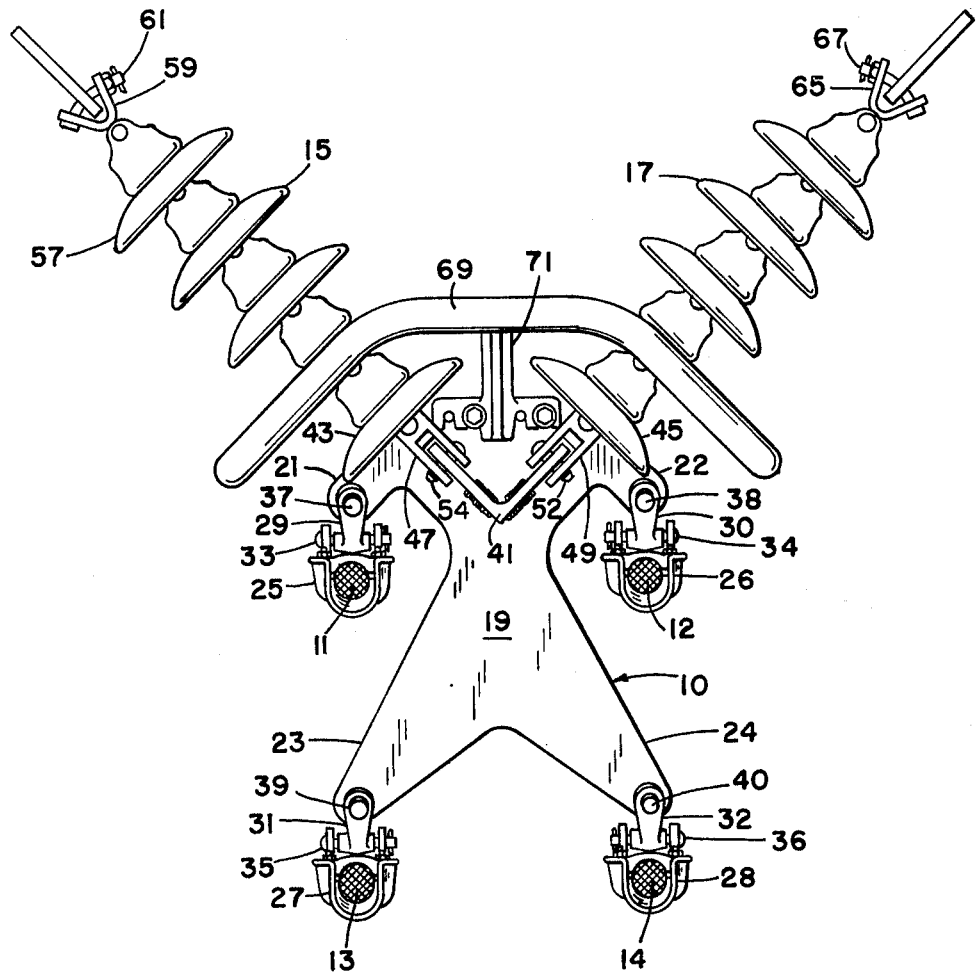
FIG. 1 is a front elevation view of the suspension apparatus of the invention having plural strings of insulators.
Figure 3:
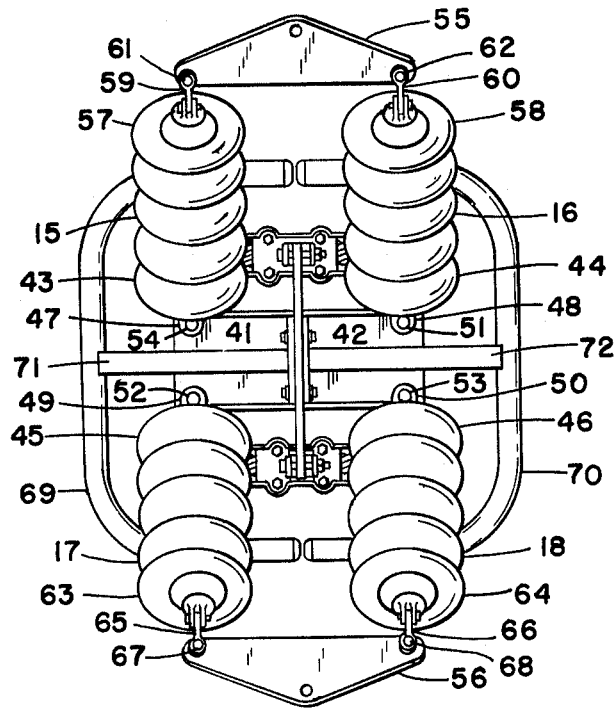
FIG. 3 is a top plan view of the apparatus of FIG. 1, taken in the direction 3—3 in FIG. 2.
Figure 2:
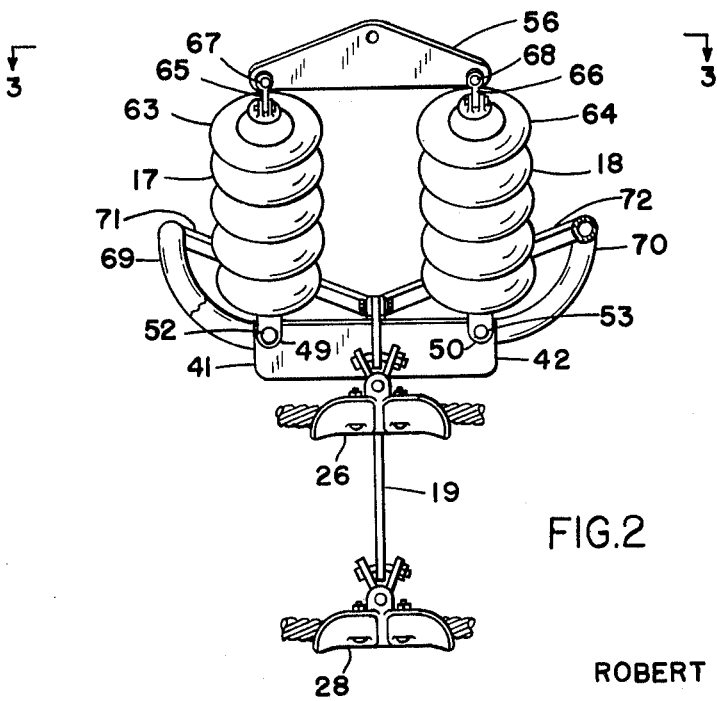
FIG. 2 is a side elevation view of the apparatus of FIG. 1.

Referring to FIGS. 1, 2, and 3, there is shown a transmission line apparatus 10 in which four conductor cables 11, 12, 13, and 14 are carried by means of four strings of suspension insulators 15, 16, 17, and 18 and held in vertically and transversely spaced relation by a suspension plate 19. The conductors 11 to 14 are carried from four arms 21, 22, 23, and 24 of the suspension plate 19 by means of associated suspension clamps 25, 26, 27, and 28. The suspension clamps 25 to 28 are connected to the respective arms 21 to 24 by means of suspension links 29, 30, 31, and 32 and pins 33, 34, 35, and 36. The suspension links 29 to 32 are connected to the respective arms 21 to 24 by bolts 37, 38, 39, and 40 and establish points of connection between the clamps and the suspension plate. The bolts 37 to 40 are arcuately formed, and referred to as suspension bolts, for various reasons which will be understood from what follows.

The suspension plate 19 is connected to the strings of insulators 15 to 18, respectively, by means of two anchor members 41 and 42 which extend in the two longitudinal directions, that is, in the longitudinal directions of the cables 11 to 14, from the suspension plate 19. The inner end insulators 43, 44, 45, and 46 of the respective strings of insulators are connected to the anchor members by means of 90° clevis links 47, 48, 49, and 50 which connect to the pins of the respective insulators. The clevis links 47 to 50 are connected to the associated portions of the anchor members 41 and 42 by means of bolts 51, 52, 53, and 54 which extend through openings in the flanges of the anchor members and determine points of connection between the anchor members and the clevises.

The strings of insulators 15 and 16 are carried from a yoke plate 55 and have the outer end insulators 57 and 58 connected to the yoke plate 55 by means of clevises 59 and 60 and suspension bolts 61 and 62. The strings of insulators 17 and 18 are carried from a yoke plate 56 and have the outer end insulators 63 and 64 connected to the yoke plate 56 by means of clevises 65 and 66 and suspension bolts 67 and 68. The yokes 55 and 56 are connected to a tower or other supporting structure and are fixed in laterally spaced relation while permitting longitudinal movement of the entire assembly.

The suspension plate 19 is constructed as a unitary member by cutting from a single piece of metal or, alternately, is fabricated from a plurality of separate pieces by stamping, welding, etc. The anchor members 41 and 42 are constructed from a right angle steel piece, attached to the suspension plate 19 by cutting a right angle slot in the body of the plate, inserting the angle piece, and welding the angle piece to the suspension piece. Alternately, the members 41 and 42 may be formed by securing two angle pieces to the plate 19, at each side thereof, by right angle flanges extending along the plate 19 and the side walls of the anchor members 41 and 42.

Voltage distribution and stress control along the strings of insulators is provided by control rings 69 and 70. The control rings 69 and 70 comprise metal tubing bent into a modified U configuration and carried by two longitudinally and vertically extending brackets 71 and 72. The control rings 69 and 70 function as arc shielding devices and to distribute electrostatic stresses uniformly between the several insulators of each string under severe conditions of ice, fog, etc.

The point of connection of the inner end insulators 43 to 46 to the anchor members 41 and 42, e.g., the intersection of the bolts 51 to 54 with the flanges of the anchor members, is disposed somewhat above the level of the intersection of the bolts 37 and 38 with the arms 21 and 22 as shown particularly in FIG. 1 for the insulators 43 and 45 and bolts 52 and 54. However, the center of action of the strings of insulators 15 to 18 is along the apex of the anchor members 41 and 42 insofar as rotational action is concerned and that apex is disposed below the level of the bolts 51 and 53. Accordingly, the assemblage has the rotational stability features described in United States Patent 3,076,866 as regards couples of forces resulting from the disposition of the conductors 11 and 12 and 13 and 14 with respect to the apex of the anchor members 41 and 42. Additionally, however, the couples of forces just referred to are augmented by the couple constituted by the effective length of each flange between the center of action of the insulators along the apex of the anchor members and the point of connection of the insulators to the suspension links 47 to 50. Such couple exerts a turning moment tending to restore the entire assemblage to the neutral position when displaced therefrom.

Embodiments in which the anchor members are disposed at a level above the points of connection of the clamps, or other holding devices, for the top two cables, to the suspension plate, and not providing the advantages of the apparatus of United States Patent 3,076,866, but having the top two conductors disposed adjacent the insulators, nonetheless achieve advantageous results. Thus, the additional couples of forces just referred to result in a significant degree of rotational stability and the proximity of the top two conductors to the insulators produces desirable grading effects as described in United States Patent 3,076,863 and United States Patent 3,076,864, idem.

The center of action of the cable system is substantially centrally between the points of connection of the suspension clamps to the suspension plate 19, e.g., at the suspension bolts 37, 38, 39, and 40, and below the points of connection of the insulator strings to the anchor members 41 and 42. This provides advantageous stability relations insofar as longitudinal movement of the top two and bottom two conductor cables is concerned.

The parallel relation of the several strings of insulators and the load dividing effect thereof results in a suspension apparatus having high mechanical strength and inherent stability under severe transient or impact loads. The apparatus is particularly useful wherever transmission lines are subjected to heavy ice or sleet loading or unloading, high winds, and the like.

The advantages of the invention may be accomplished in structural arrangements whereby the two top conductors 11 and 12 are supported above and between the transverse strings of insulators 15 and 17, and 16 and 18, respectively. Arrangements in which a single conductor cable is carried above and between the strings of insulators, incorporating the teachings of United States Patents 3,076,863 and 3,076,864, are disclosed in FIGS. 4, 5, and 6 herein.

Figure 4:
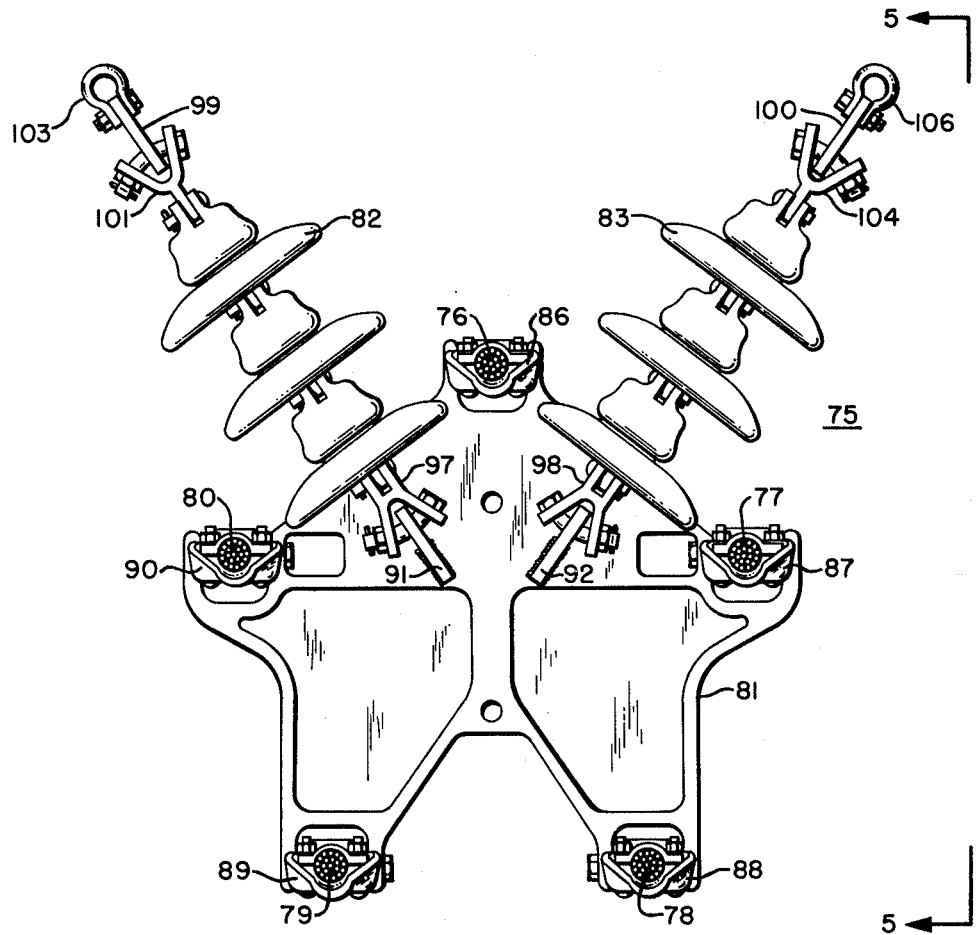
FIG. 4 is a front elevation view of another suspension apparatus embodying the invention.
Figure 6:
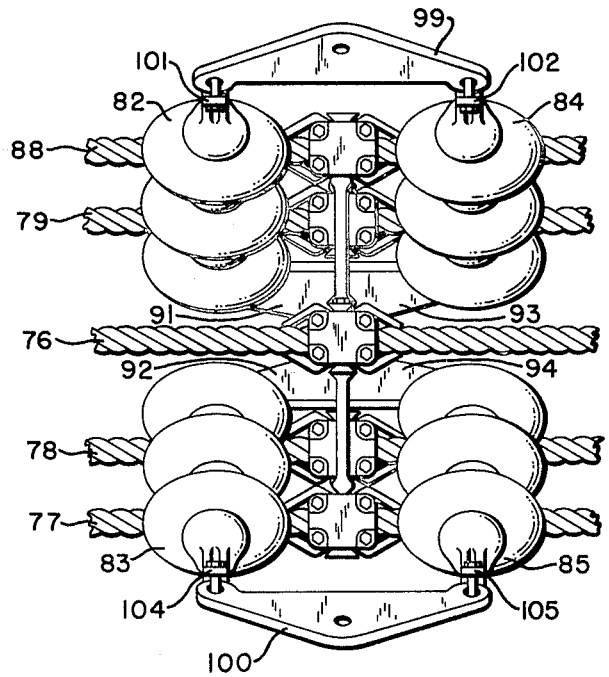
FIG. 6 is a top plan view of the suspension apparatus of FIG. 4, taken in the direction 6—6 in FIG. 5.
Figure 5:
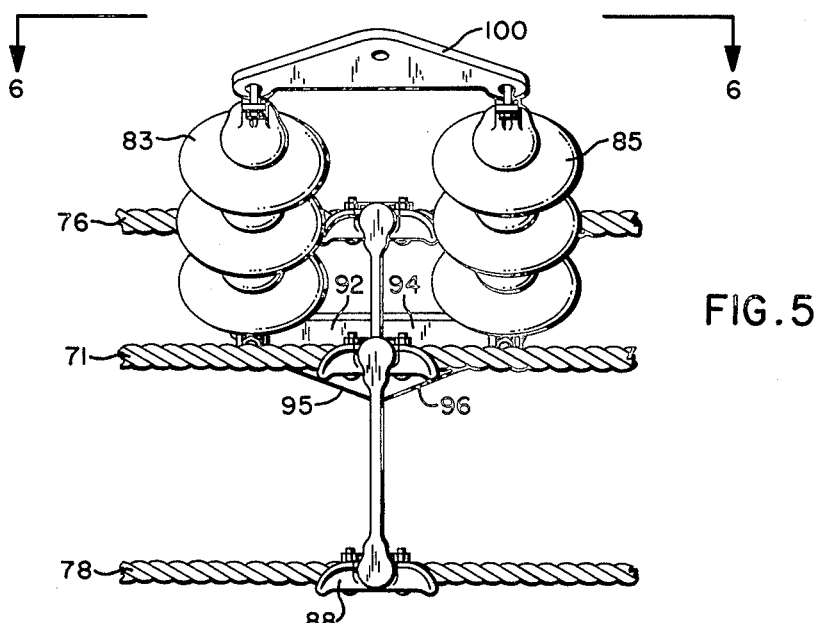
FIG. 5 is a side elevation view of the apparatus of FIG. 1, taken in the direction 5—5 in FIG. 4.

In FIGS. 4, 5, and 6, a transmission line apparatus 75 is constituted by five conductor cables 76, 77, 78, 79, and 80 held in transversely spaced relation by a suspension plate 81 and four strings of suspension insulators 82, 83, 84, and 85. The conductor cables are held by conductor clamps 86, 87, 88, 89, and 90, each carried on laterally spaced trunnions or stanchions which are an integral part of the suspension plate 81. The conductor clamps 86 to 90 inclusive and the stanchion supports have certain advantages in suspension apparatus for plural conductor cables and are described in United States Patents 3,076,864 and 3,185,763.

The strings of suspension insulators 82 to 85 inclusive are connected to the suspension plate 81 and the suspension plate is carried from the insulators by anchor members 91 and 92 and 93 and 94 which extend from the body of the suspension plate 81 in both longitudinal directions of the transmission line. The anchor members 91 to 94 are each constituted as flat steel plates of rectangular cross section having a tapered triangular lower portion, indicated in FIG. 5 at 95 and 96 for the anchor members 92 and 94. Two longitudinally opposed anchor members, as the anchor members 92 and 94, may be conveniently fabricated as a single piece from bar stock received in a rectangular opening through the body of the suspension plate 81 and welded to the suspension plate. Transverse reinforcing plates (not shown) may be welded between laterally opposed anchor members, as, e.g., across the extremities of the anchor members 91 and 92, outwardly from the attachments of the clevises 97 and 98 to the members. The body of the suspension plate 81 may be constituted as an integral or fabricated part, as described for the suspension plate 19.

The strings or insulators 82 and 84 are carried from a yoke plate 99 and the strings of insulators 83 and 85 are carried from a yoke plate 100. The strings of insulators 82 and 84 have the end insulators connected to the yoke plate 99 by means of clevises 101 and 102, and the yoke plate 99 is connected to a tower or other support structure by means of a clevis 103 connected to the yoke plate at the longitudinally central part thereof. The strings of insulators 83 and 85 have the end insulators conected to the yoke plate 100 by means of clevises 104 and 105, and the yoke plate 100 is connected to a tower or other support structure by means of a clevis 106 connected to the yoke plate at the longitudinally central part thereof.

The pivotal arrangement of the yoke plates 99 and 100 on the clevises 103 and 106 enables rotational movement of the entire assemblage with respect to the supporting structure. This movement is distinct from and in addition to the movement which comprises translation of the suspension plate 81 and anchor members 91, 92, 93, and 94 parallel to the yoke plates 99 and 100, that is, as though the yoke plates 99 and 100 were rigidly fixed to the support structure. It will be seen that the assemblage is stable for both movements, since the restoring forces resulting from displacement tend to return the assemblage to the neutral position.

The suspension arrangement of FIGS. 4, 5, and 6 has the anchor members 91 and 93 laterally spaced from the anchor members 92 and 94 a distance sufficient to accommodate vertical movement of the conductor 76 without contact between the conductor and the insulator discs. The angle between the insulator strings 83 and 85 is advantageously chosen to coincide with the angular spacing between the five conductors 76, 77, 78, 79, and 80, that is, 72 degrees in the embodiment shown herein.

Various embodiments of the apparatus are useful in the practice of the invention. Particularly, various forms of the suspension clamps 25 to 28 and of the conductor clamps 86 to 90, such as elastic grips and the like, may be utilized for holding the conductor cables.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. In a transmission line in which a line conductor is constituted by a plurality of conductor cables, a suspension plate arranged transversely of the conductor cables and having lateral, longitudinal, and vertical axes in the lateral, longitudinal, and vertical directions of the line conductor, means carrying the conductor cables from the suspension plate in spaced laterally symmetric relation thereto, rigid anchor members extending in both longitudinal directions from the suspension plate, the anchor members on each side of the plate having two parts thereof spaced in the lateral direction of the suspension plate and line conductor, and four strings of suspension insulators each connected to one of the said anchor members and spaced, two in each longitudinal direction from the plate and two in each lateral direction of the conductor, at the points of attachment of the insulator strings to the anchor members.

2. Transmission line apparatus in accordance with claim 1, in which the four strings of suspension insulators are inclined, two in one direction and two in the other direction, from the vertical axis of the suspension plate in laterally spaced and laterally symmetric relation thereto.

3. Transmission line apparatus in accordance with claim 2, in which the laterally spaced strings of insulators are connected to yoke plates at the upper extremities of the insulator strings, the said yoke plates being adapted for pivotal connection at the longitudinally central part thereof to a fixed support structure.

4. Transmission line apparatus in accordance with claim 3, in which the anchor members are flat plates having one dimension thereof directed along the line of the strings of insulators, and means pivotally connecting the adjacent end insulators of the strings of insulators to the flat plates for translational and rotational movement of the suspension plate with respect to the support structure.

5. Transmission line apparatus in accordance with claim 2, in which there is a conductor carried from the suspension plate centrally between the laterally spaced strings of insulators, and the anchor members are laterally spaced to prevent contact between the conductor and the insulators.

6. Transmission line apparatus in accordance with claim 2, in which the anchor members comprise unitary V-shaped members extending one in one longitudinal direction and the other in the remaining longitudinal direction from the suspension plate.

7. A suspension plate for arrangement transversely of a plurality of transmission line conductor cables to carry the cables from a plurality of strings of suspension insulators with lateral, longitudinal, and vertical axes thereof in the lateral, longitudinal, and vertical directions of the conductor cables, comprising a metal body, means on the body for carrying the conductor cables in laterally symmetric relation with respect to a vertical axis centrally of the plate, at least one anchor member extending in each longitudinal direction from the body of the suspension plate, structurally united with the said body comprising means spaced apart in the lateral direction of the suspension plate and spaced from the body of the suspension plate in each longitudinal direction therefrom for connecting four strings of insulators to the suspension plate.

8. A suspension plate in accordance with claim 7, in which the anchor members comprise unitary transversely V-shaped members extending, one in one longitudinal direction and the other in the remaining longitudinal direction, from the suspension plate and the means spaced apart in the lateral direction of the suspension plate comprises the flanges of the V-shaped members.

9. A suspension plate in accordance with claim 7, in which the anchor members comprise elongate plates separated in the lateral direction of the suspension plate.

10. In a transmission line in which a line conductor is constituted by a plurality of conductor cables, a suspension plate arranged transversely of the conductor cables, and having lateral, longitudinal, and vertical axes in the lateral, longitudinal, and vertical directions of the line conductor, means carrying the conductor cables from the suspension plate in spaced laterally symmetric relation thereto, including laterally spaced stanchions at the top central part of the plate and a conductor clamp supported by the stanchions for carrying one conductor cable, and means carrying two of the cables in spaced, laterally opposed relation at opposite sides of the suspension plate below the said one conductor cable, plural insulator strings inclined with respect to a vertical axis centrally through the suspension plate, and means at each longitudinal side of the suspension plate connecting the insulator strings to the suspension plate with the insulator strings extending symmetrically between the said one conductor cable and the said laterally opposed conductor cables of the line conductor and the insulator strings separately connected to the said means at points spaced apart in the lateral direction of the conductors and in each longitudinal direction from the suspension plate, the angular relation between the strings of insulators in the lateral direction thereof substantially coinciding with the angular relation between the conductor cables of the line conductor.

11. Transmission line apparatus in accordance with claim 10, in which there are five conductor cables and the angular spacing between the insulator strings is of the order of 72 degrees.

References Cited by the Examiner

UNITED STATES PATENTS

| 2,858,360 | 10/1958 | Kaminski et al. | 174—149 X |
| 3,036,149 | 5/1962 | Fiero | 174—141 |
| 3,076,863 | 2/1963 | Lantz et al. | 174—149 X |
| 3,076,864 | 2/1963 | Lantz et al. | 174—149 X |
| 3,076,866 | 2/1963 | Lantz | 174—149 |

FOREIGN PATENTS

| 597,417 | 5/1934 | Germany. |
| 961,004 | 4/1957 | Germany. |

OTHER REFERENCES

Harmon: "Effect of Bundle Conductor Field on EHV Transmission Line Design," Electrical Engineering, vol. 80, No. 3, March 1961, pages 183–188.

"Special Hardware Designed For Penelic 460–kv. Line," Electrical World, April 10, 1961, page 50.

JOHN F. BURNS, *Primary Examiner.*